(12) United States Patent
Liu

(10) Patent No.: US 6,876,413 B2
(45) Date of Patent: Apr. 5, 2005

(54) AUTOMATICALLY ALIGNED LIQUID CRYSTAL DISPLAY AND ITS REFLECTOR STRUCTURE

(76) Inventor: Hong-Da Liu, 2F, No. 249, Chung-Iang Road, 11 Lin, Shin-Gwo Lii, Juipei City, Hsinchu (TW)

( * ) Notice: Subject to any disclaimer, the term of this patent is extended or adjusted under 35 U.S.C. 154(b) by 227 days.

(21) Appl. No.: 10/267,950

(22) Filed: Oct. 8, 2002

(65) Prior Publication Data

US 2004/0066479 A1 Apr. 8, 2004

(51) Int. Cl.[7] .............................................. G02F 1/1335
(52) U.S. Cl. ........................ 349/113; 349/112; 349/64; 349/129
(58) Field of Search .......................... 349/64, 112, 113, 349/129

*Primary Examiner*—Robert H Kim
*Assistant Examiner*—George Y. Wang

(57) ABSTRACT

An automatically aligned liquid crystal display comprises an upper and a lower substrates, at least one polarizer, at least one serial retardation films and a uniformly distributed and vertically or near-vertically aligned liquid crystal layer. The substrates have respectively a common electrode layer and a pixel electrode layer thereon. One of the electrode layers is transparent and the other is a layer of automatically aligned diffusing reflective or partially reflective devices. The device is formed on a single substrate. The automatically aligned liquid crystal display of the invention has different bump structures formed in the pixel region, around the boundary of the pixel region, at a contact hole near the pixel center, or around the boundary of the pixel region and the transparent area. The reflective or partially reflective liquid crystal display of the invention forms multiple domains with good properties of a very high contrast ratio and a wider viewing angle.

25 Claims, 19 Drawing Sheets

| dual mode | reflective mode (contrast ratio > 20:1) | | transparent mode (contrast ratio > 100:1) |
|---|---|---|---|
| viewing angle | >160H | 140H | |
| | 110V | 160V | |
| light intensity | 100 % | 100 % | |
| gray scale inversion | 160H, 160V | 160H, 160V | |
| | 120 diagonal direction | 160 diagonal direction | |
| maximal contrast ratio | >350:1 | >800:1 | |

FIG. 7

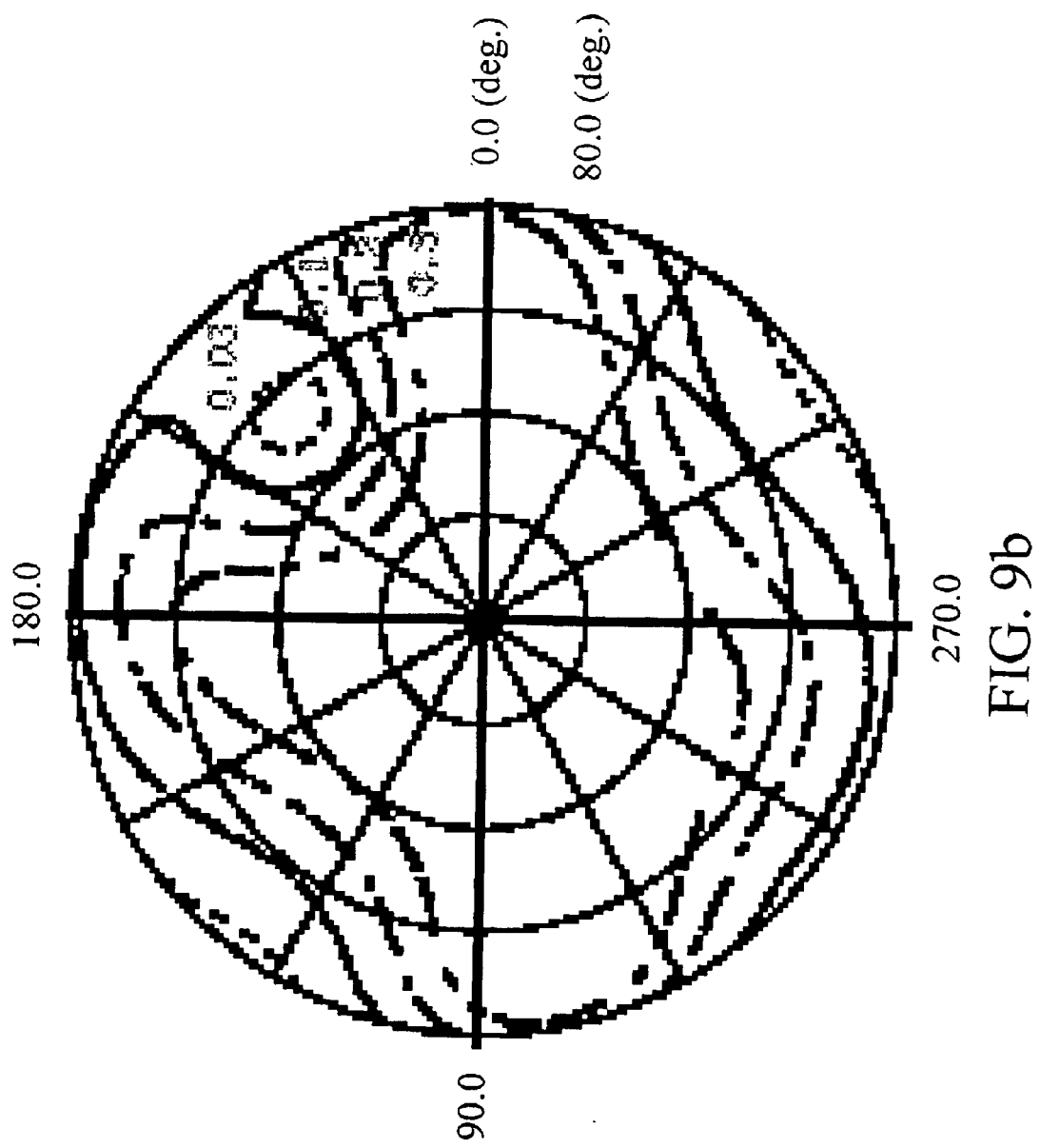

AUTOMATICALLY ALIGNED LIQUID CRYSTAL DISPLAY AND ITS REFLECTOR STRUCTURE

FIELD OF THE INVENTION

The present invention relates generally to a wide viewing angle liquid crystal display (LCD), and more specifically to an automatically aligned reflective or partially reflective liquid crystal display and its reflector structure.

BACKGROUND OF THE INVENTION

Partially reflective liquid crystal displays have become popular devices for portable information systems because of their advantages in light weight, thin thickness and low power consumption. A reflective liquid crystal display with excellent legibility under both bright and dark scenes has been developed. Because commonly used reflective or partially reflective liquid crystal displays are normally white twisted nematic, their viewing angle is only about 40 degrees and they have severe color aberration and limited contrast problems. Therefore, their applications are mostly limited in small portable products, such as mobile phone, personal digital assistant (PDA) or notebook computer.

SUMMARY OF THE INVENTION

The present invention has been made to overcome the above-mentioned drawbacks of a conventional reflective or partially reflective liquid crystal display. The primary object is to provide a structure of an automatically aligned multi-domain liquid crystal display. The liquid crystal display comprises an automatically aligned diffusing reflective or partially reflective device. The device may have different structures of convex or concave bumps formed thereon. For examples, (1) convex or concave bumps are formed in the pixel region, (2) convex bumps are formed around the boundary of the pixel region, (3) convex bumps are formed around the boundary of the pixel region, and a concave bump is formed at a contact hole near the pixel center, and (4) convex bumps are formed around the boundary of the pixel region, a concave bump is formed at a contact hole near the pixel center, and surround wall bumps are formed around the boundary of the transparent area.

These bump structures make the liquid crystal display of the invention to form multiple domains. The automatically aligned diffusing reflective or partially reflective device is also used to diffuse light.

The structure of the automatically aligned liquid crystal display of the invention comprises an upper and a lower substrates, at least one polarizer, at least one serial retardation films and a uniformly distributed and vertically or near-vertically aligned liquid crystal layer. The substrates have respectively a common electrode layer and a pixel electrode layer formed thereon. One of the electrode layers is transparent and the other is a layer of an automatically aligned diffusing reflective device. The automatically aligned diffusing reflective device has convex or concave bump structures in each pixel region. The average height of the bump structures is greater than or equal to that of the scattering layer, but less than the liquid crystal cell gap. Liquid crystal directors near the bump structure have pre-tilted angles.

As mentioned above, the automatically aligned diffusing reflective device has structures of convex or concave bumps that are formed in the pixel region, around the boundary of pixel region, at a contact hole near the pixel center, or around the boundary of pixel region and the transparent area. The LCD with a convex bump structure around the boundary of pixel region and a concave bump at a contact hole near the pixel center has a single cell gap. That is, the average of liquid crystal cell gaps at the transparent area is equal to that at the reflective area in a single pixel region. On the other hand, the LCD with a convex bump structure around the boundary of the pixel region, a concave bump structure at the contact hole near the pixel center or a surround wall-bump structure around the boundary of the transparent area has multiple cell gaps. That is, the average of liquid crystal cell gaps at the transparent area of this structure is different from that at the reflective area in a pixel region.

The structures of the automatically aligned liquid crystal display of the invention can be applied to a reflective wide viewing angle normal black mode thin film transistor (TFT) LCD, a partially reflective TFT-LCD, a reflective or partially reflective normal black mode LCD, or a partially reflective LCD. When the structure is applied to a partially reflective LCD, the structural design uses polarizers and achromatic wide-band quarter-wavelength plates to form near-circular polar light and retardation films, such as A-plates, C-plates or bi-axial films to form good dark state in normal black mode.

The automatically aligned diffusing reflective device in the invention can have many kinds of structures. Three preferred embodiments are (a) comprising a reflective metal layer and an inner diffusion layer, (b) comprising a scattering layer, a reflective metal layer, an over coating layer, and a layer of indium tin oxide (ITO) pattern, and (c) comprising a scattering layer, a reflective metal layer, a color filter, an over coating layer, and a layer of ITO pattern. In addition, the automatically aligned diffusing reflective device has different structures, such as (1) convex or concave bumps are formed in the pixel region, (2) convex bumps are formed around the boundary of the pixel region, (3) convex bumps are formed around the boundary of the pixel region, and a concave bump is formed at a contact hole near the pixel center, and (4) convex bumps are formed around the boundary of the pixel region, a concave bump is formed at a contact hole near the pixel center, and surround wall bumps are formed around the boundary of the transparent area. The reflective metal layer in the automatically aligned diffusing reflective device can be a totally reflective metal layer, a transparent thinner metal layer, or a metal layer of transparent electrodes with openings in the transparent area and a layer of aluminum- or silver-alloy in the reflective area.

The automatically aligned reflector structure of the invention is formed on a single substrate. A color filter can be formed on the substrate at the same side or opposite side of a TFT substrate. The color filter can also be formed on the substrate having a common electrode layer thereon.

By the combinational effect of the bump structure in the pixel region of the automatically aligned reflector structure and the lateral electric field in the reflective metal layer, no rubbing process is necessary in the fabrication process. In addition, by controlling the pre-tilted directions of liquid crystal directors in the totally reflective area, the reflective liquid crystal display of the invention forms multiple domains with good properties of very high contrast ratio and wide viewing angle.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 7 shows optical results of the implementation of the automatically aligned liquid crystal display of the invention.

FIGS. 9a–9c show respectively the angle views in a dark state, bright state, and contrast ratio of the automatically aligned liquid crystal display under a transparent mode according to the invention.

DETAILED DESCRIPTION OF THE PREFERRED EMBODIMENTS

Figure 1A:
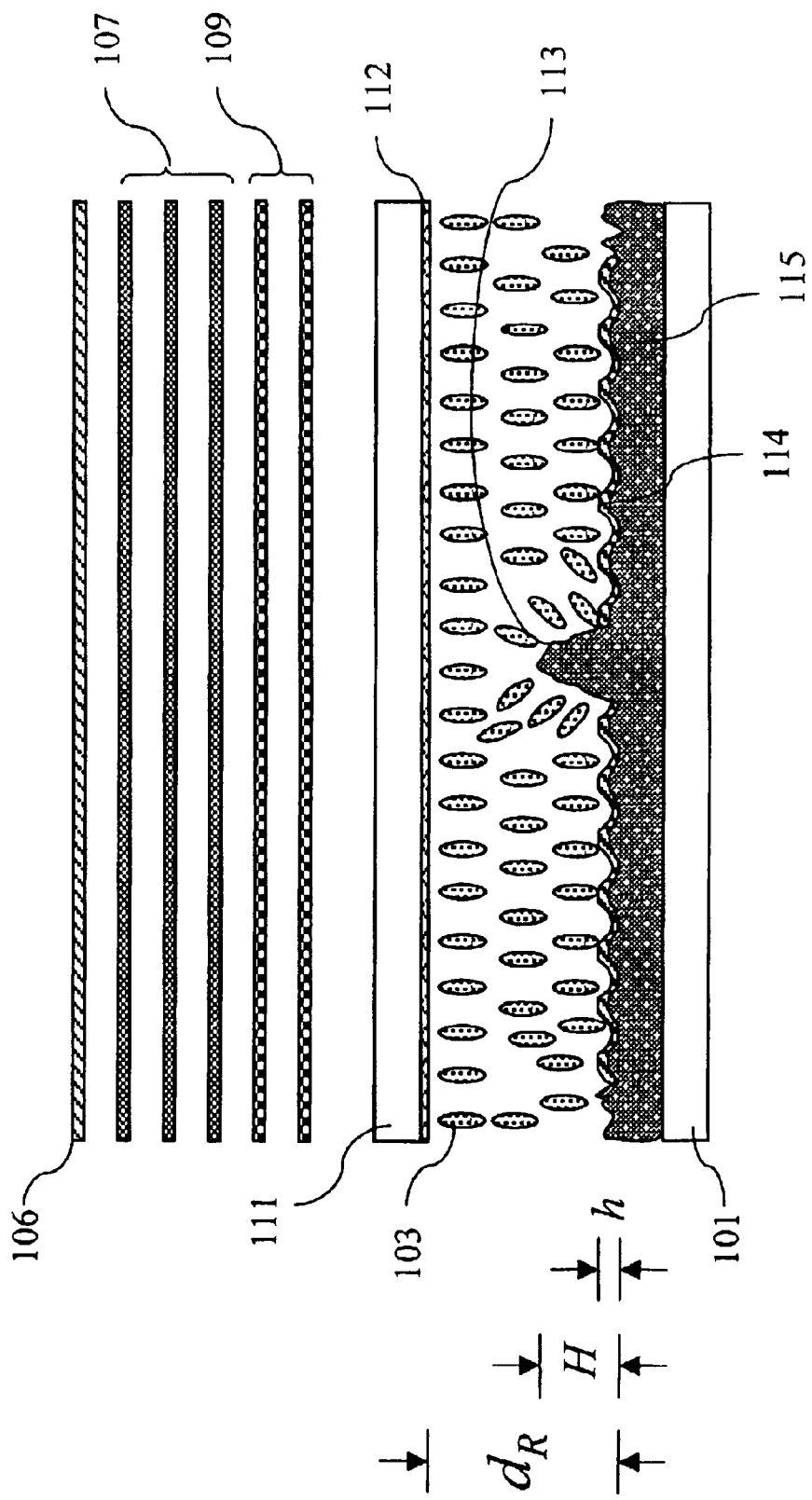
FIG. 1a shows a cross-sectional view of an automatically aligned liquid crystal display according to the invention.

FIG. 1a shows a cross-sectional view of an automatically aligned liquid crystal display according to the invention. The liquid crystal display comprises mainly an upper substrate 111, a lower substrate 101, a uniformly distributed and vertically or near-vertically aligned liquid crystal layer 103 between two substrates, a polarizer 106, achromatic wide-band quarter-wavelength plates 107, and retardation films 109. The polarizer 106 and achromatic wide-band quarter-wavelength plates 107 are used to form near-circular polar light. Retardation films 109 can be A-plates, C-plates or bi-axial films to form good dark state in normal black mode. A common electrode layer is formed on one of the two substrates and a pixel electrode layer is formed on the other substrate. One of the electrode layers is transparent and the other is an electrode layer having diffusing reflective devices being formed thereon. Each diffusing reflective device has a convex bump structure in the pixel region.

Referring to FIG. 1a, a transparent common electrode layer 112 is formed on the upper substrate 111. The lower substrate 101 has an automatically aligned diffusing reflective device formed thereon. The automatically aligned diffusing reflective device comprises a reflective metal layer 114 and an inner diffusion layer 115. The inner diffusion layer 115 further comprises a convex bump structure 113 in the pixel region. The average height H of the bump structure 113 is greater than or equal to the average height h of the scattering layer, but less than the liquid crystal cell gap $d_R$. The liquid crystal directors near the bump structure 113 have pre-tilted angles.

As shown in FIG. 1a, the automatically aligned reflector structure consists of the lower substrate 101, the reflective metal layer 114 and the inner diffusion layer 115 with convex bump structure 113 formed in the pixel region according to the invention. The preferred range of the ratio $H/d_R$ of the average height H of the scattering layer to the liquid crystal cell gap $d_R$ is between 0.05 and 1.

Figure 1B:
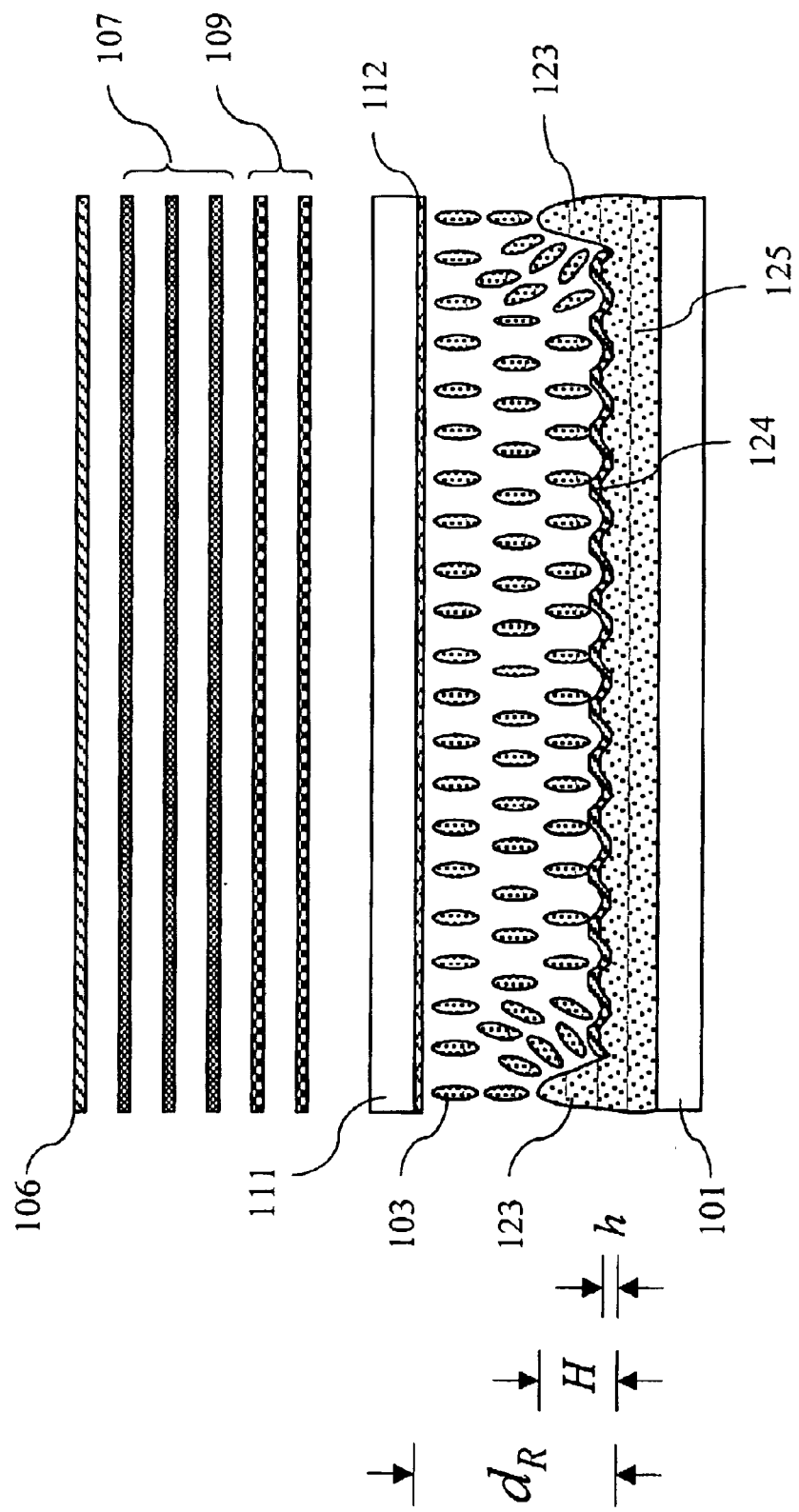
FIG. 1b shows a cross-sectional view of an automatically aligned liquid crystal display according to the invention where convex bumps are formed around the boundary of the pixel region.

FIG. 1b shows a cross-sectional view of the automatically aligned liquid crystal display according to the invention where convex bumps are formed around the boundary of pixel region. This type of structure is applied in totally reflective liquid crystal displays. In the preferred embodiment, the automatically aligned diffusing reflective device on the lower substrate 101 has convex bumps 123 around the boundary of the pixel region. The liquid crystal directors near the convex bumps 123 have pre-tilted angles. To get better optical efficiency, the retardation $a_f$ of A-plate, the retardation of $c_f$ C-plate, the birefringence $\Delta n$ of liquid crystals and the cell gap $d_R$ of the liquid crystal layer must satisfy the following two equations:

$$0.8 \times \Delta n \times d_R \leq c_f + 125 \text{ nm} \leq 1.3 \times \Delta n \times d_R,$$

$$0 \leq a_f \leq 50 \text{ nm},$$

where the unit of retardation is nm.

As shown in FIG. 1b, the automatically aligned reflector structure consists of the lower substrate 101, the reflective metal layer 124 and the inner diffusion layer 125 with convex bumps 123 formed in the pixel region according to the invention.

Figure 1C:
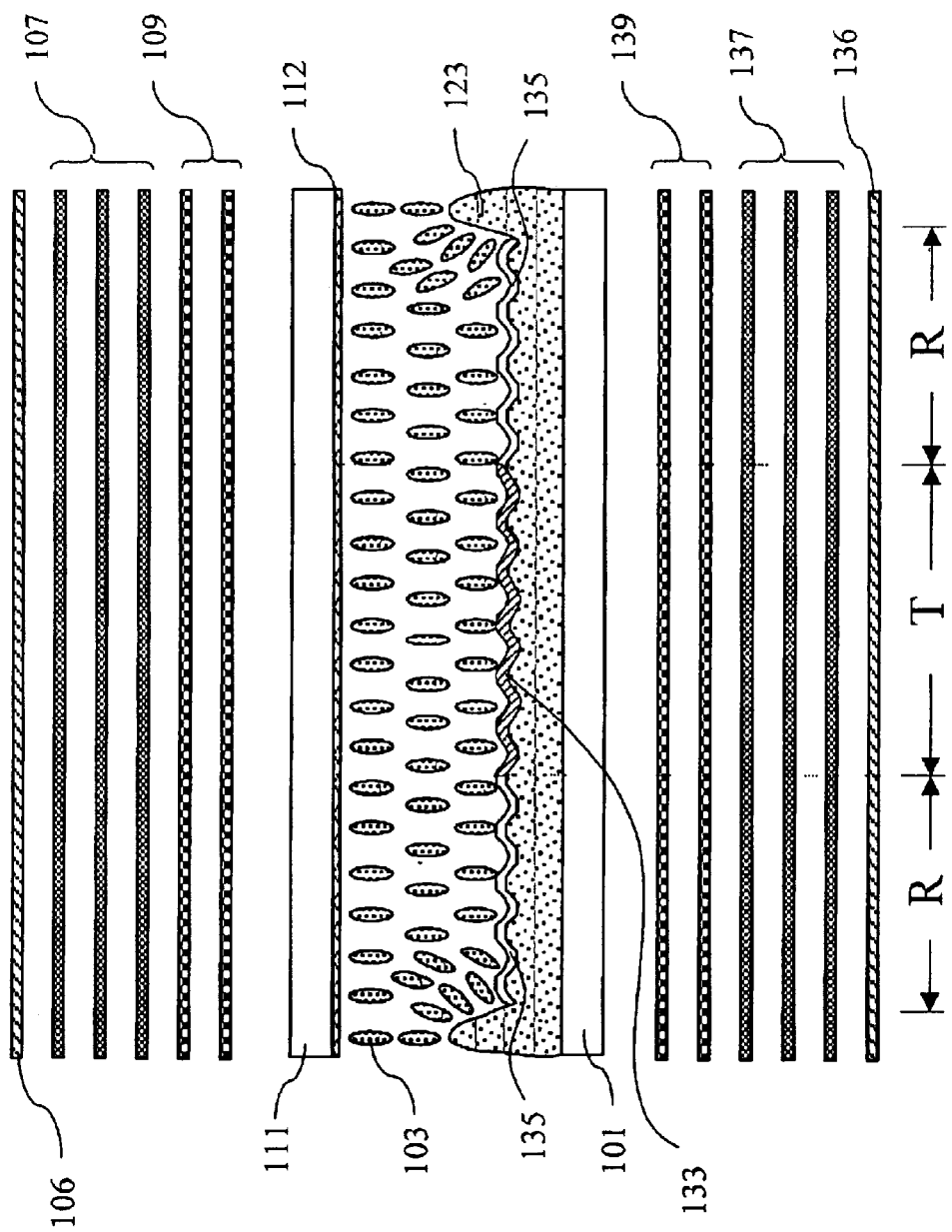
FIG. 1c shows a cross-sectional view of an extended liquid crystal display shown in FIG. 1b, where a reflective metal layer comprises a transparent electrode in the transparent area and a reflective metal in the reflective area.

FIG. 1c shows a cross-sectional view of an extended liquid crystal display shown in FIG. 1b, where the reflective metal layer comprises a transparent electrode 133 in the transparent area T and a reflective metal 135 in the reflective area R. In addition, this LCD structure includes a polarizer 136, achromatic wide-band quarter-wavelength plates 137, and retardation films 139 under the lower substrate. Retardation films 139 can be A-plates, C-plates or bi-axial films. This type of structure is applied to partially reflective liquid crystal displays. To get a better optical efficiency, the retardation $a_f$ of A-plate, the retardation $c_f$ of C-plate, the retardation $a_b$ or $c_b$ of bi-axial films, the birefringence. $\Delta n$ of liquid crystals and the cell gap $d_T$ in the transparent area must satisfy the equations (1) and (2) or the equations (3) and (4):

$$0 \leq a_b \leq 100 \text{ nm},\quad (1)$$

$$0.4 \times \Delta n \times d_T \leq c_b + 65 \text{ nm} \leq 0.75 \times \Delta n \times d_T \quad (2)$$

$$0.8 \times \Delta n \times d_T \leq c_f + c_b 185 \text{ nm} \leq 1.3 \times \Delta n \times d_T \quad (3)$$

$$30 \text{ nm} \leq a_b + a_f \leq 120 \text{ nm},\quad (4)$$

where the unit of retardation is nm.

Figure 1D:
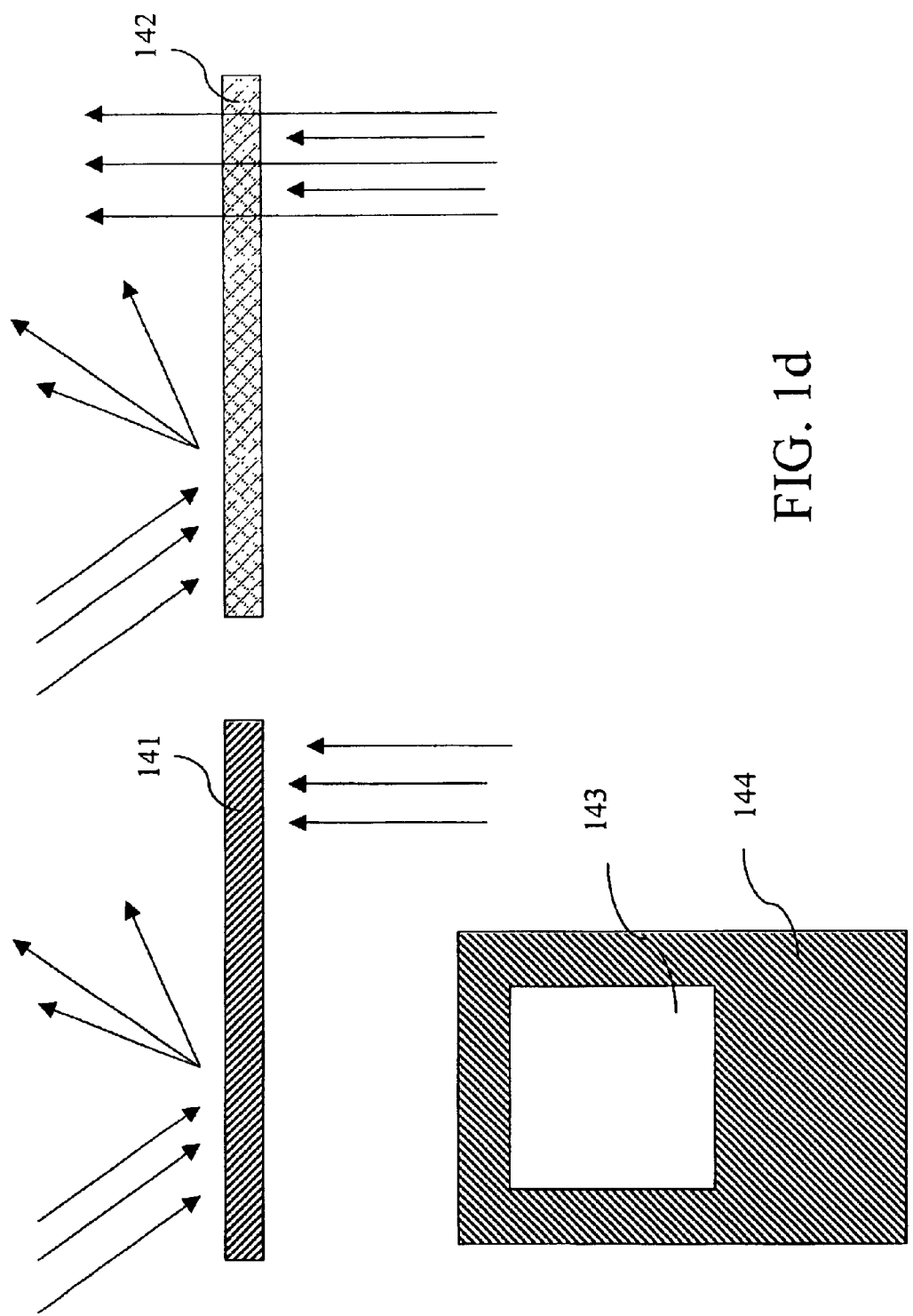
FIG. 1d shows three kinds of reflective metal layer in the automatically aligned diffusing reflective device according to the invention.

FIG. 1d shows three kinds of reflective metal layer in the automatically aligned diffusing reflective device according to the invention. The first kind of reflective metal layer is a totally reflective metal layer 141. The second kind of reflective metal layer is a transparent thinner metal layer 142. The third kind of reflective metal layer comprises a transparent electrode 143 with opening in the transparent area and a layer of aluminum- or silver-alloy in the reflective area 144.

By the combinational effect of the bump structure in the pixel region of the automatically aligned reflector structure and the lateral electric field in the reflective metal layer, no rubbing process is necessary in the invention. In addition, by controlling the pre-tilted directions of liquid crystal directors in the totally reflective area, the reflective liquid crystal display of the invention forms multiple domains with good properties of very high contrast ratio and wide viewing angle.

In addition to the design of the automatically aligned reflector structure shown in FIG. 1b that a convex bump structure is formed around the boundary of pixel region, there are two other kinds of design structure. One is that not only convex bumps around the boundary of pixel region is formed, but also a concave bump at a contact hole near the pixel center is formed. The other is that a dual surround wall-bump structure is formed around the boundaries of the pixel region and the transparent area. Liquid crystal directors near these bumps have pre-tilted angles. In the following, FIG. 2 and FIG. 3 will show the cross-sectional views of these two automatically aligned reflector structure that are respectively applicable to reflective and partially reflective liquid crystal displays.

Figure 2A:
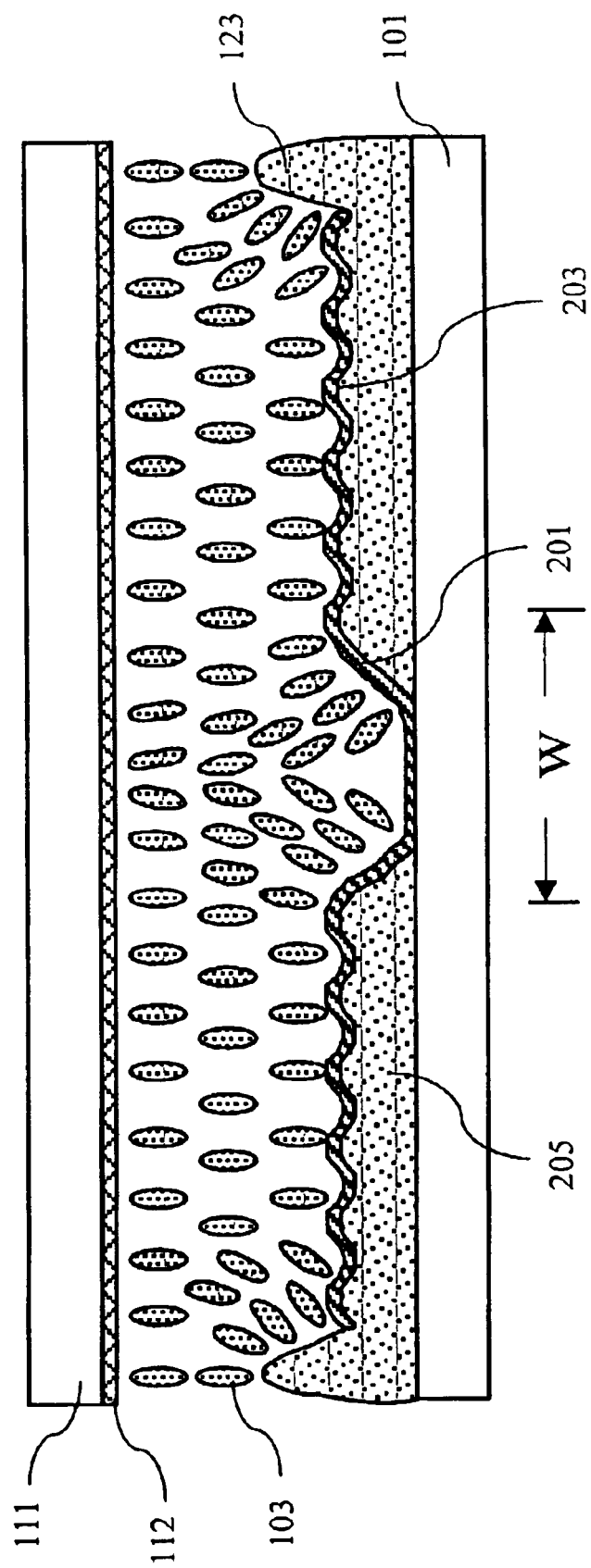
FIG. 2a illustrates a cross-sectional view of the automatically aligned reflector structure of the invention applicable to reflective liquid crystal displays, on which convex bumps are formed around the boundary of the pixel region and a concave bump at a contact hole near the pixel center is formed.

FIG. 2a illustrates a cross-sectional view of the automatically aligned reflector structure according to the invention, on which convex bumps around the boundary of the pixel region and a concave bump structure at a contact hole near the pixel center are formed. This reflector structure is applicable to reflective liquid crystal displays. Referring to FIG. 2a, convex bumps 123 around the boundary of pixel region and a concave bump 201 at a contact hole near the pixel center are formed. Liquid crystal directors near the convex bumps 123 and the concave bump 201 have pre-tilted angles. Literal w in FIG. 2a represents the diameter of the contact hole. Note that this reflector structure has a unique cell gap. That is, the liquid crystal cell gap $d_T$ at the transparent area T is equal to the liquid crystal cell gap $d_R$ at the reflective area R in a single pixel region.

In the FIG. 2a, the lower substrate 101, the reflective metal layer 203, and the inner diffusion layer 205 including the convex bump structure 123 and the concave anti-bump structure 201, are formed as the second preferred embodiment of the automatically aligned reflector structure of the invention.

Figure 2B:
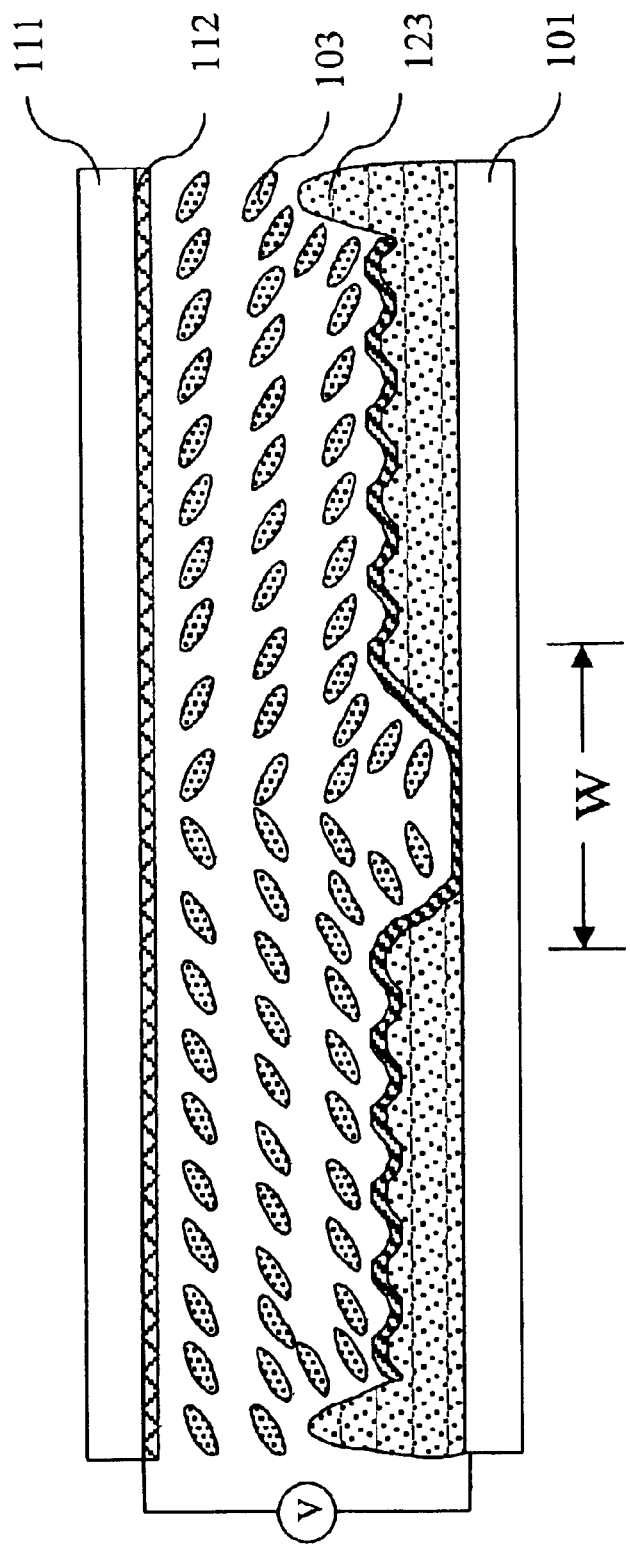
FIG. 2b shows that liquid crystal molecules change their directions from vertical or near-vertical alignment as shown in FIG. 2a to slanted or near-horizontal alignment after a driving voltage V is applied.

FIG. 2b shows that liquid crystal molecules 103 change their directions from vertical or near-vertical alignment shown in FIG. 2a to slanted or near-horizontal alignment after a driving voltage V is applied.

Figure 3A:
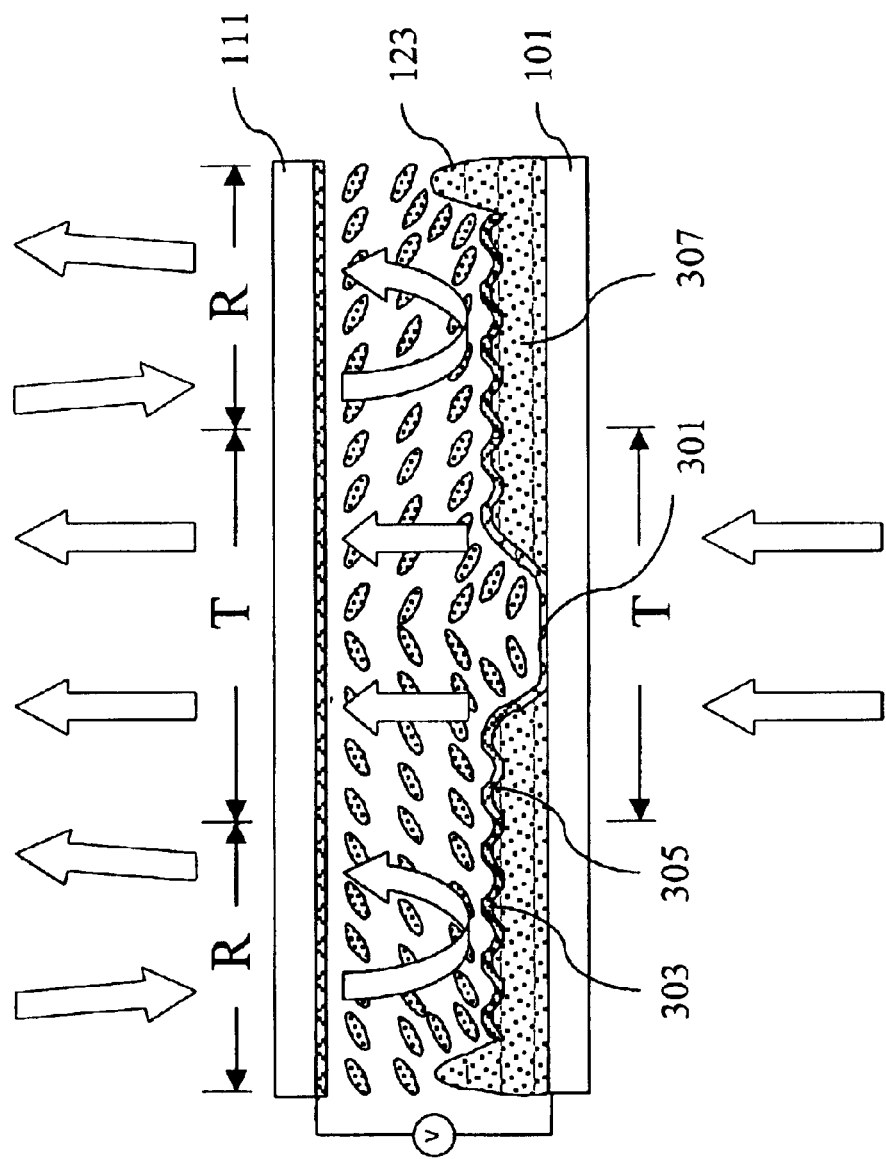
FIG. 3a illustrates a cross-sectional view of the automatically aligned reflector structure of the invention applicable to partially reflective liquid crystal displays, on which convex bumps are formed around the boundary of pixel region and a concave bump at a contact hole near the pixel center is formed.

FIG. 3a illustrates a cross-sectional view of the automatically aligned reflector structure according to the invention, on which convex bumps around the boundary of the pixel region and a concave bump at a contact hole near the pixel center are formed. This reflector structure is applicable to partially reflective liquid crystal displays. Referring to FIG. 3a, the reflective area R refers to the scope of the reflective metal layer 303 and the transparent area T refers to the scope of the transparent electrode layer 305. By the combinational effect of the convex bumps 123 around the boundary of the pixel region and the lateral electric field in the reflective metal layer 303, no rubbing process is necessary. Therefore this invention controls the pre-tilted angles of liquid crystal directors. Moreover, in the transparent area T, this invention traps the defect points by the effect of the concave bump at the contact hole 301 near the pixel center. This reflector structure has a unique cell gap. The director distribution of liquid crystals near this bump structure is simulated and will be described in more detail.

In the FIG. 3a, the lower substrate 101, the reflective metal layer 303, the transparent electrode layer 305, and the inner diffusion layer 307 which includes the convex bumps 123 formed around the boundary of the pixel region and a concave bump formed at a contact hole near the pixel center, form the third preferred embodiment of the automatically aligned reflector structure of the invention.

Figure 3B:
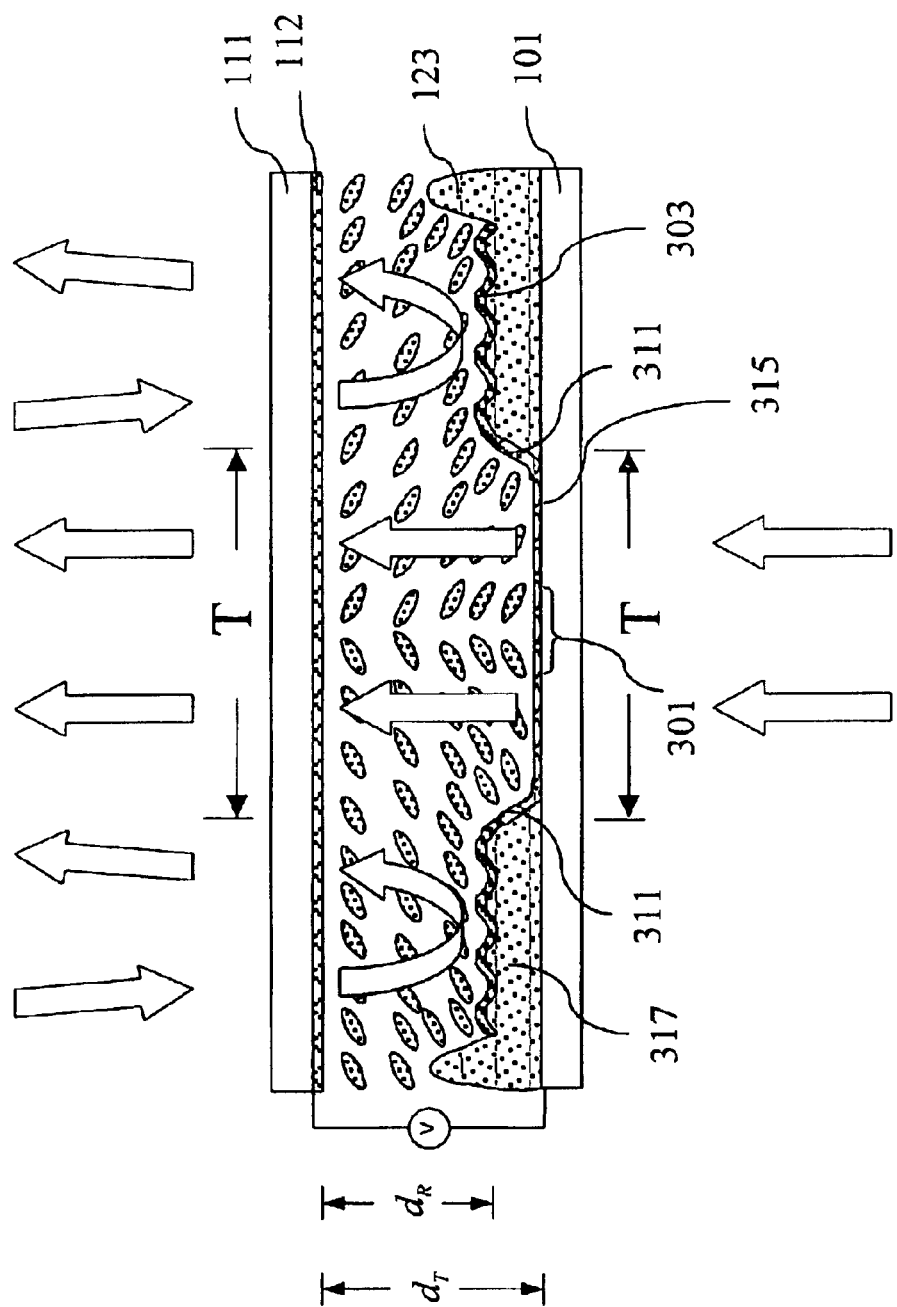
FIG. 3b illustrates a cross-sectional view of the automatically aligned reflector structure according to the invention, on which convex bumps are formed around the boundary of the pixel region, a concave bump is formed at a contact hole near the pixel center, and surround wall-bumps are formed around the boundary of the transparent area.

FIG. 3b illustrates a cross-sectional view of the automatically aligned reflector structure having a dual surround wall-bump structure according to the invention. This reflector structure is applicable to partially reflective liquid crystal displays. The dual surround wall-bump structure includes convex bumps 123 around the boundary of the pixel region, a concave bump at the contact hole 301 near the pixel center and surround wall-bumps around the boundary 311 of the transparent area T. The transparent area T refers to the scope of the transparent electrode layer 315. Liquid crystal molecules are forced to tilt toward the pixel center when a driving voltage V is applied. A photolithography process is used to fabricate the dual surround wall-bump structure and the inner scattering layer. No extra or complicated process is needed. Also, it is worthy to mention that the liquid crystal cell gap $d_T$ at the transparent area T of this dual surround wall-bump structure is different from the liquid crystal cell gap $d_R$ at the reflective area R in a single pixel region. That is, $d_T$ is not equal to $d_R$. The preferred relationship between $d_T$ and $d_R$ is $d_R \leq d_T \leq 2 d_R$. To get better optical efficiency, the birefringence $\Delta n$, the cell gaps $d_T$ and $d_R$ must satisfy the following equations: $100 \text{ nm} \leq \Delta n \cdot d_R \leq 220 \text{ nm}$, and $180 \text{ nm} \leq \Delta n \cdot d_T \leq 450 \text{ nm}$. In manufacturing the liquid crystals, it is optional to add the chiral dopant to the liquid crystals. The chiral dopant can be added to the liquid crystals so that the pitch of the liquid crystal molecules is greater than 20 $\mu$m.

In FIG. 3b, the lower substrate 101, the reflective metal layer 303, the transparent electrode layer 315 and the inner diffusion layer 317 are formed as the fourth preferred embodiment of the automatically aligned reflector structure of the invention. The inner diffusion layer 317 includes the convex bump structure 123 formed around the boundary of pixel region, the concave anti-bump structure formed at the contact hole near the pixel center, and a surround wall-bump structure formed around the boundary 311 of the transparent area T.

Figure 4:
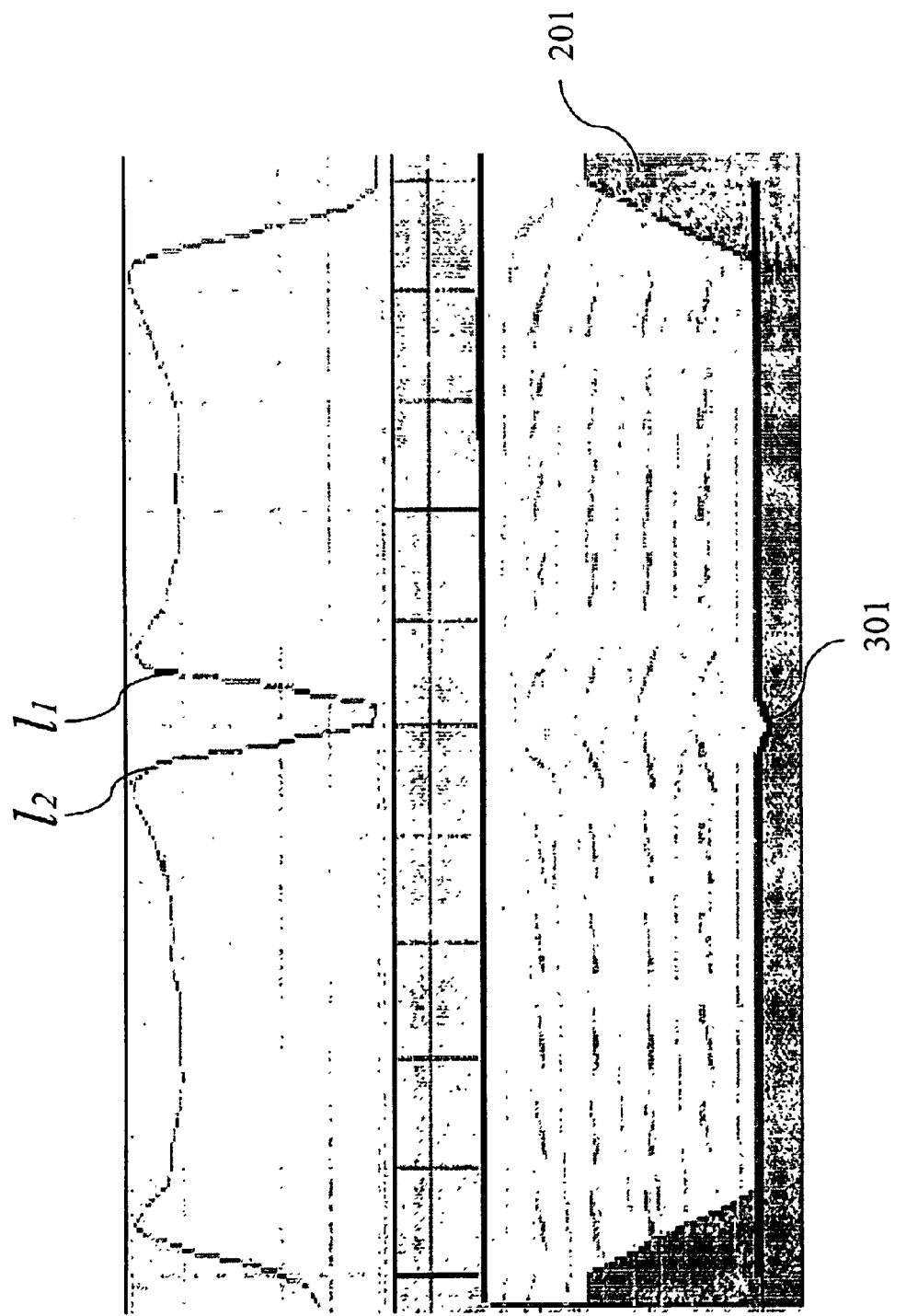
FIG. 4 shows a simulated distribution of liquid crystal directors according to the invention, where a concave bump is at a contact hole near the pixel center.

FIG. 4 shows a simulated distribution of liquid crystal directors near the concave bump according to the invention. Referring to FIG. 4, defect points are trapped by the concave bump formed near the pixel center. The convex bumps 201 formed around the boundary of a single pixel region are shown on both sides. Liquid crystal directors near the convex bumps 201 are vertically or near-vertically aligned along the boundary of the convex bumps 201. Liquid crystal directors near the concave anti-bump structure formed at the contact hole 301 near the pixel center are also vertically or near-vertically aligned along the boundary of the concave bump. Moreover, disclination lines $l_1$ and $l_2$ of defect points are pulled toward the central hole of the pixel as shown in FIG. 4.

Figure 5:
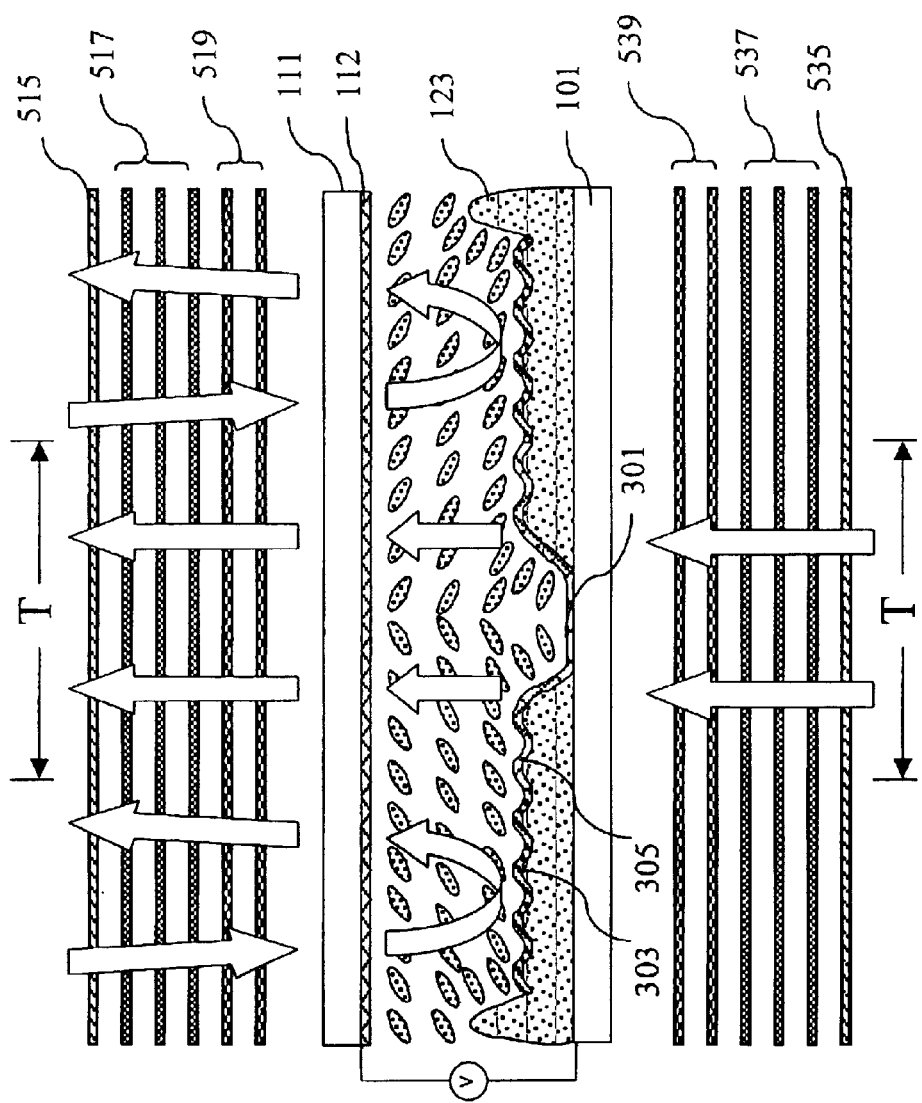
FIG. 5 shows a cross-sectional view of a partially reflective liquid crystal display according to the invention.

FIG. 5 shows a cross-sectional view of a partially reflective liquid crystal display according to the invention. The partially reflective liquid crystal display has an automatically aligned reflector structure having a dual surround wall-bump structure as shown in FIG. 3b. In addition to the reflector structure shown in FIG. 3b, the liquid crystal display further comprises an upper polarizer 515 and a lower polarizer 535, achromatic wide-band quarter-wavelength plates 517 and 537, and retardation films 519 and 539. Because of the convex bumps formed around the boundary of pixel region in the partially reflective liquid crystal display, liquid crystal directors around the boundary of pixel region have high pre-tilted angles. A surround wall-bump structure is formed around the boundary of the transparent area of the partially reflective liquid crystal display. Liquid crystal cell gap at the transparent area is higher than that at the reflective area.

The partially reflective liquid crystal display uses wide band circular polarizers that liquid crystal molecules do not adjust the incident bias. Because some liquid crystal molecules in a partially reflective liquid crystal display are located between two crossed circular polarizers, the dark state is perfectly dark when no driving voltage is applied. The partially reflective liquid crystal display uses serial retardation films to compensate vertically or near-vertically aligned liquid crystals in order to eliminate angular dependence in a dark state. After a driving voltage is applied, liquid crystal director is re-oriented. The tilt angle is decided by the combinational effect of the dual surround wall-bump structure and the lateral electric field. Also, disclination lines are pulled toward the central hole of the pixel.

Figure 6A:
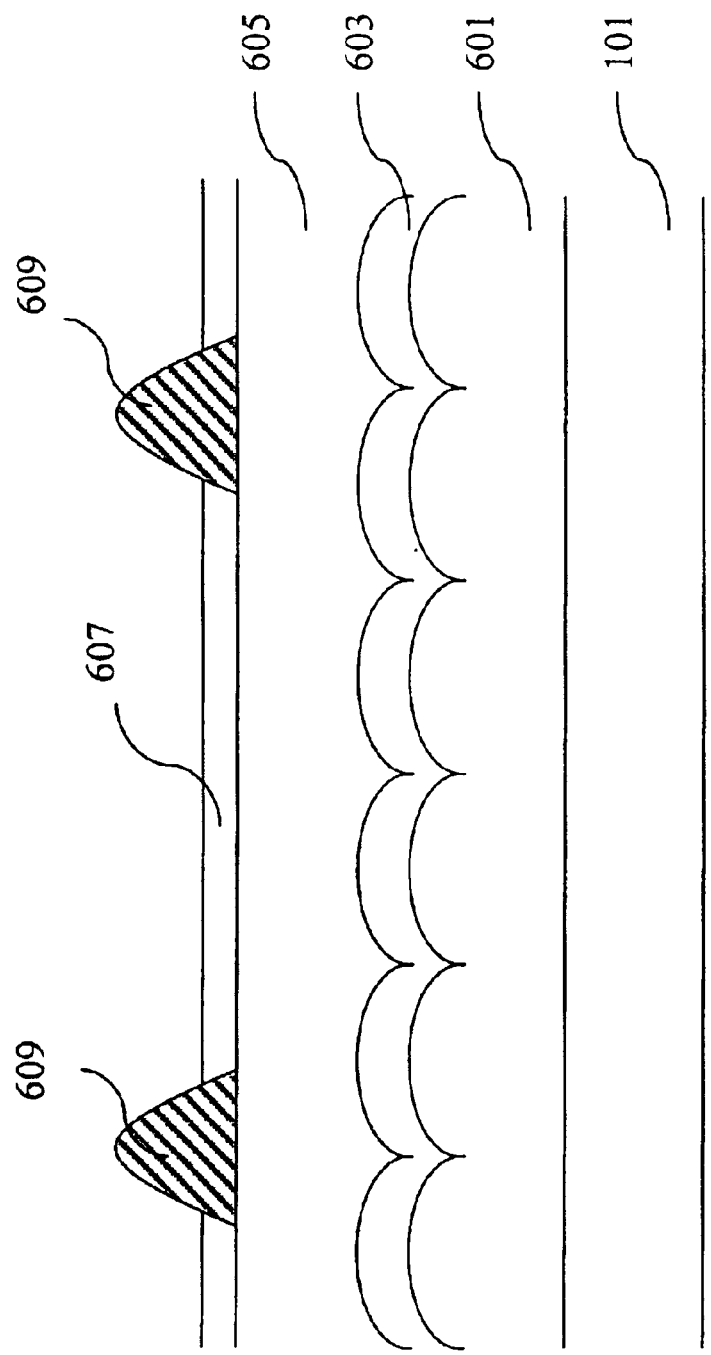
FIGS. 6a and 6b show two preferred embodiments of reflector structures according to the invention.
Figure 6B:
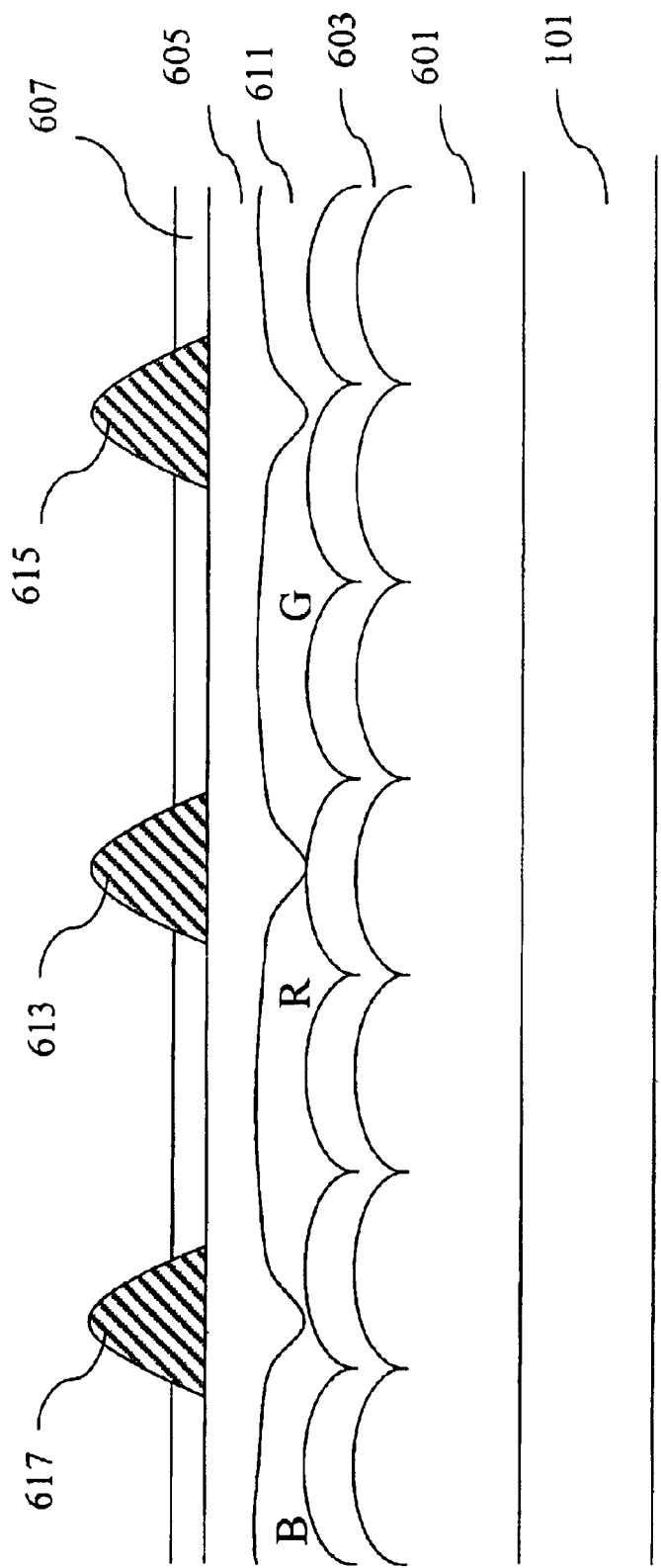

In addition to the automatically aligned reflector structures shown in FIG. 1b, FIG. 2a, FIG. 3a and FIG. 3b, this invention respectively shows two more preferred embodiments of the reflector structures in FIG. 6a and FIG. 6b.

The reflector structure shown in FIG. 6a comprises from bottom to top a lower substrate 101, a scattering layer 601, a reflective metal layer 603, an over coating layer 605, and a layer of indium tin oxide (ITO) pattern 607 and a convex bump structure 609 being formed around the boundary of pixel region. The reflector structure shown in FIG. 6b comprises from bottom to top a lower substrate 101, a scattering layer 601, a reflective metal layer 603, a color filter 611, an over coating layer 605, and a layer of ITO pattern 607 and convex bumps 613, 615 and 617 formed respectively around the boundaries of red (R), green (G) and blue (B) sub-pixels. The color filter 611 on the reflector may be a multiple-processed color filter, in which the transparent area and the reflective area have different thickness. The color filter will get a better color performance.

All reflector structures of the invention comprise a reflective metal layer. The material for the reflective metal layer can be aluminum (Al), silver (Ag), aluminum alloy, silver alloy, or multi-layer film with high reflectivity. The reflector structure can be designed as a reflective structure, partially reflective structure or structure with openings, as illustrated in FIG. 1d. The shape of opening can be slotted, rectangular, circular or combination of rectangles and circles. If the ratio of the transparent area, i.e. open area, to the total area of the transparent area plus the reflective area is between 5% and 30%, the reflector structure will get a better reflective effect.

The automatically aligned reflector structure of the invention is formed on a single substrate. A color filter can be formed on the substrate at the same side or opposite side of a TFT substrate. The color filter can also be formed on the substrate having a common electrode layer thereon. The pixel electrode layer can be an active matrix device, such as TFT or thin film diode (TFD), or a passive matrix device. The material for the transparent electrode layer can be ITO or indium zinc oxide (IZO). The material for the inner diffusion layer can be positive photoresist, negative photoresist, or acrylic resin. The material for the retardation film may include polymer film.

The application of the reflector structure of the invention to a partially reflective liquid crystal display can get very good results in both the dark and bright states, as well as a very high contrast ratio under both the transparent and reflective modes. It also has a wider viewing angle and a high light intensity. FIG. 7 shows optical performance of the automatically aligned liquid crystal display according to the invention. As shown in FIG. 7, under the reflective mode with contrast ratio>20:1, the horizontal viewing angle is higher than 160°, the vertical viewing angle is 110° and the positive direction contrast ratio is as high as 350:1. Under the transparent mode with contrast ratio>100:1, the horizontal viewing angle is 140°, the vertical viewing angle is 160° and the positive direction contrast ratio is as high as 800:1.

Figure 8A:
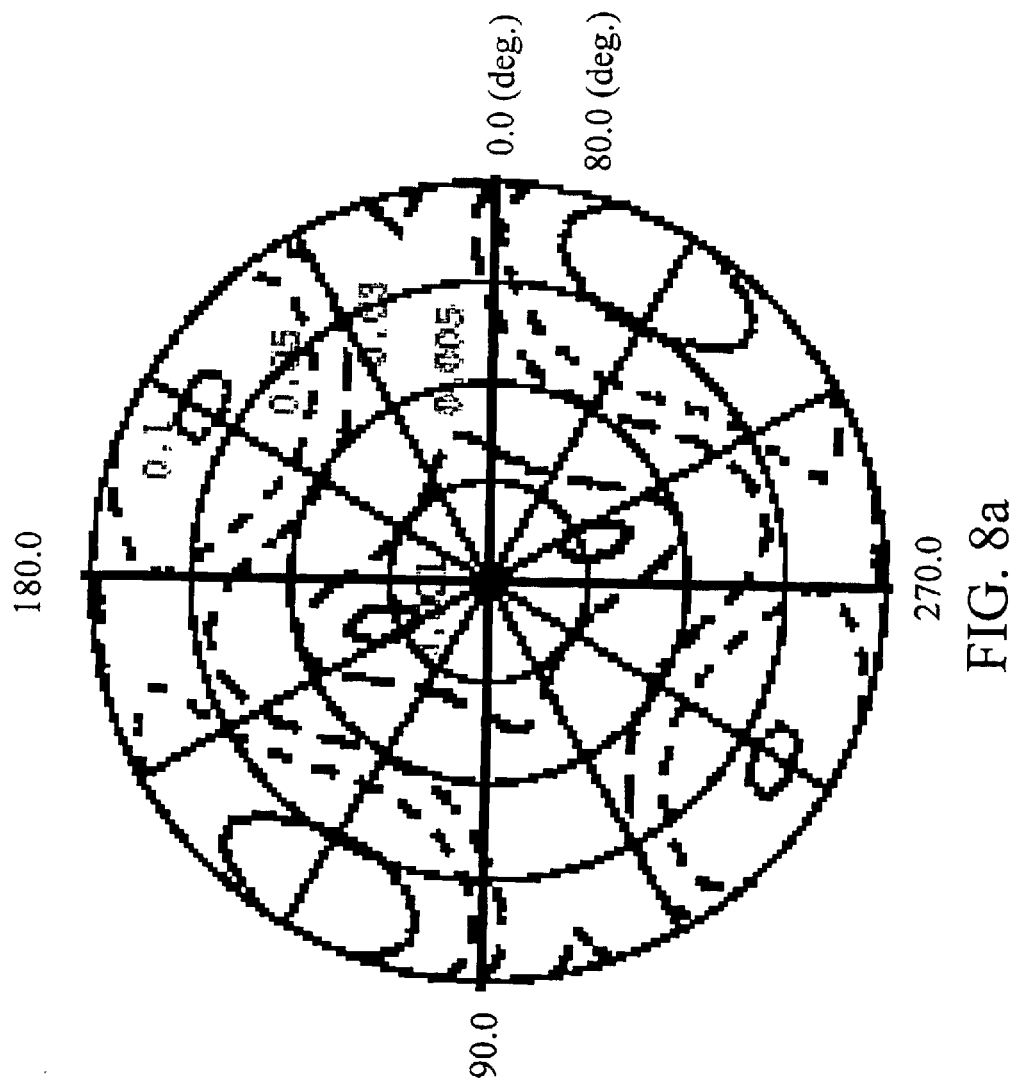
FIGS. 8a–8c show respectively the angle views in a dark state, bright state, and contrast ratio of the automatically aligned liquid crystal display under a reflective mode according to the invention.
Figure 8B:
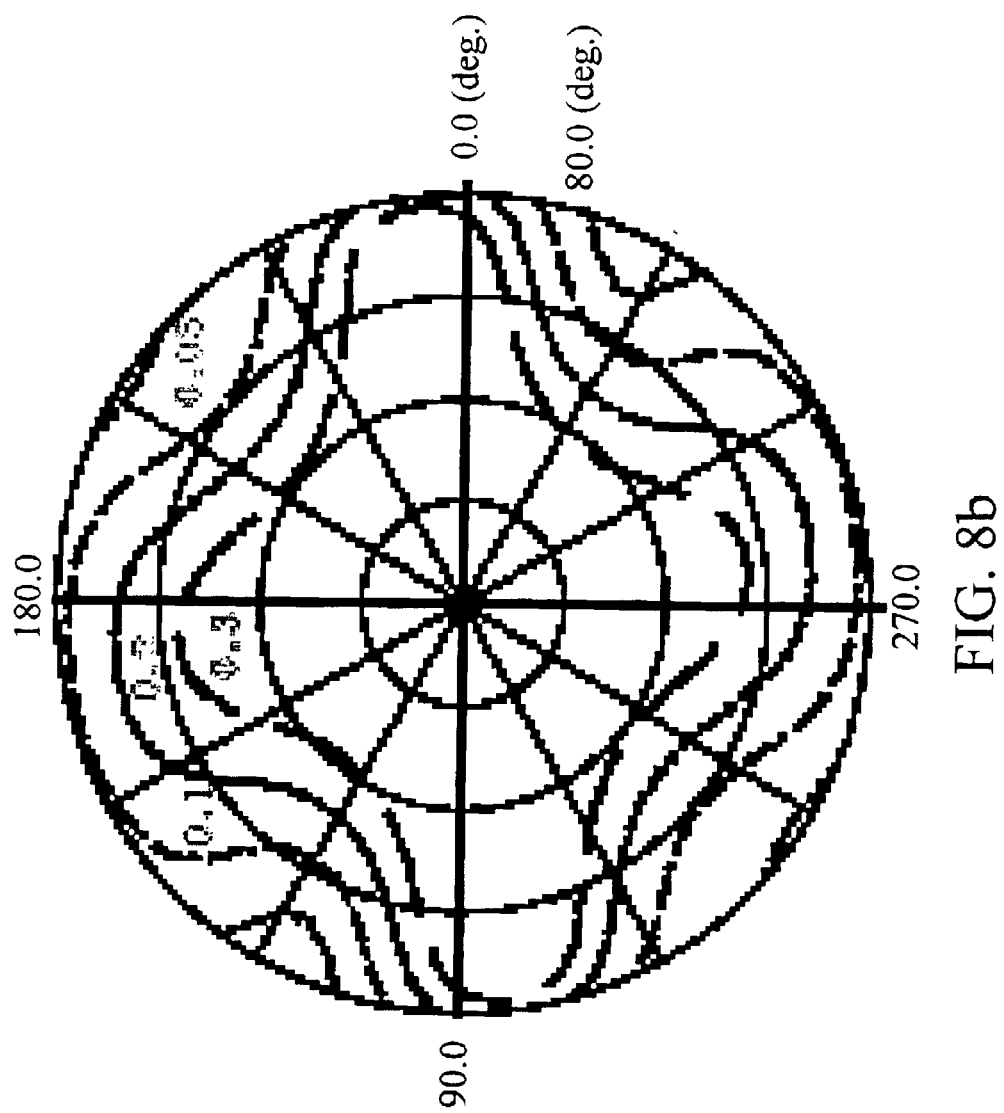
Figure 8C:
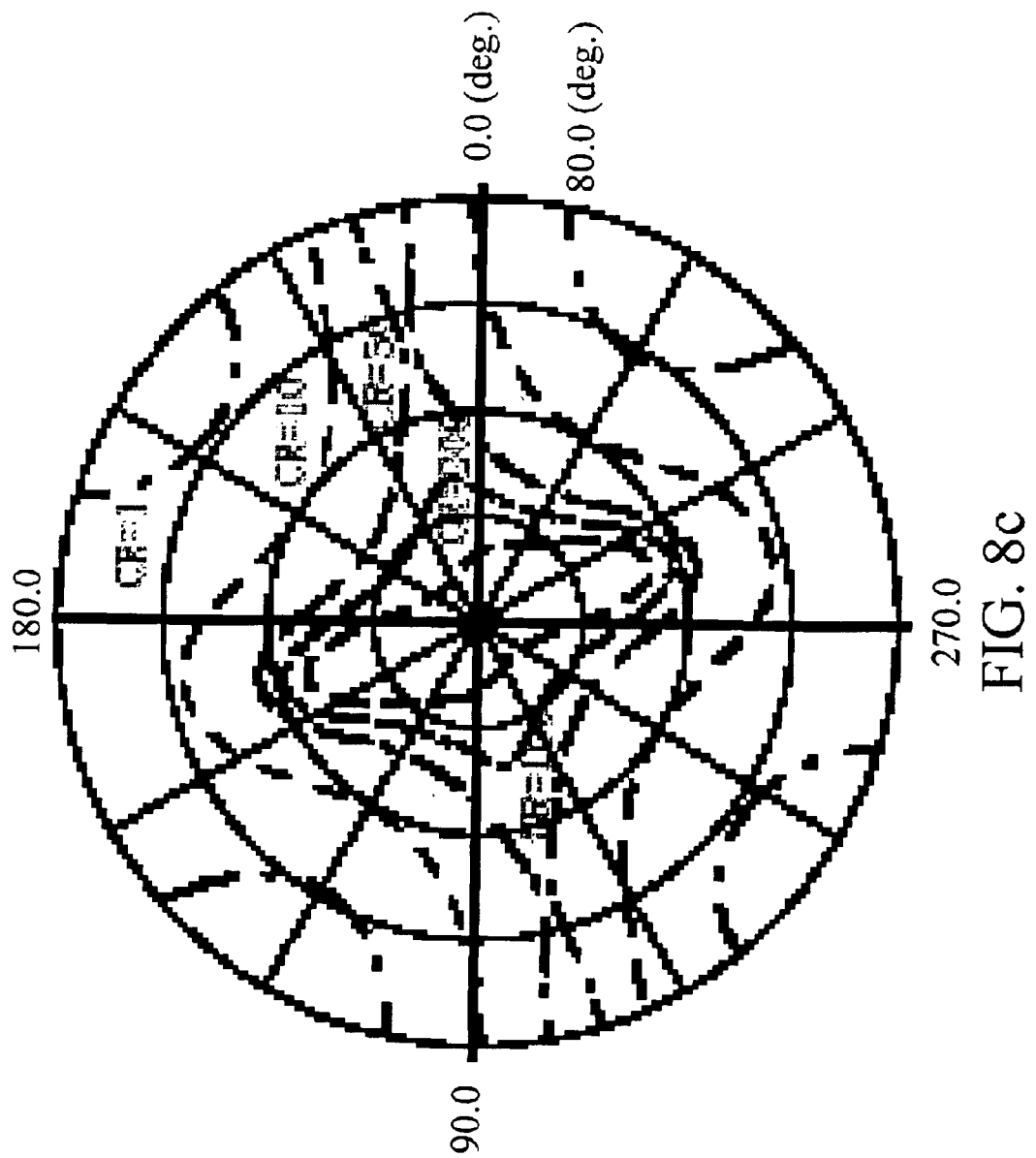
Figure 9A:
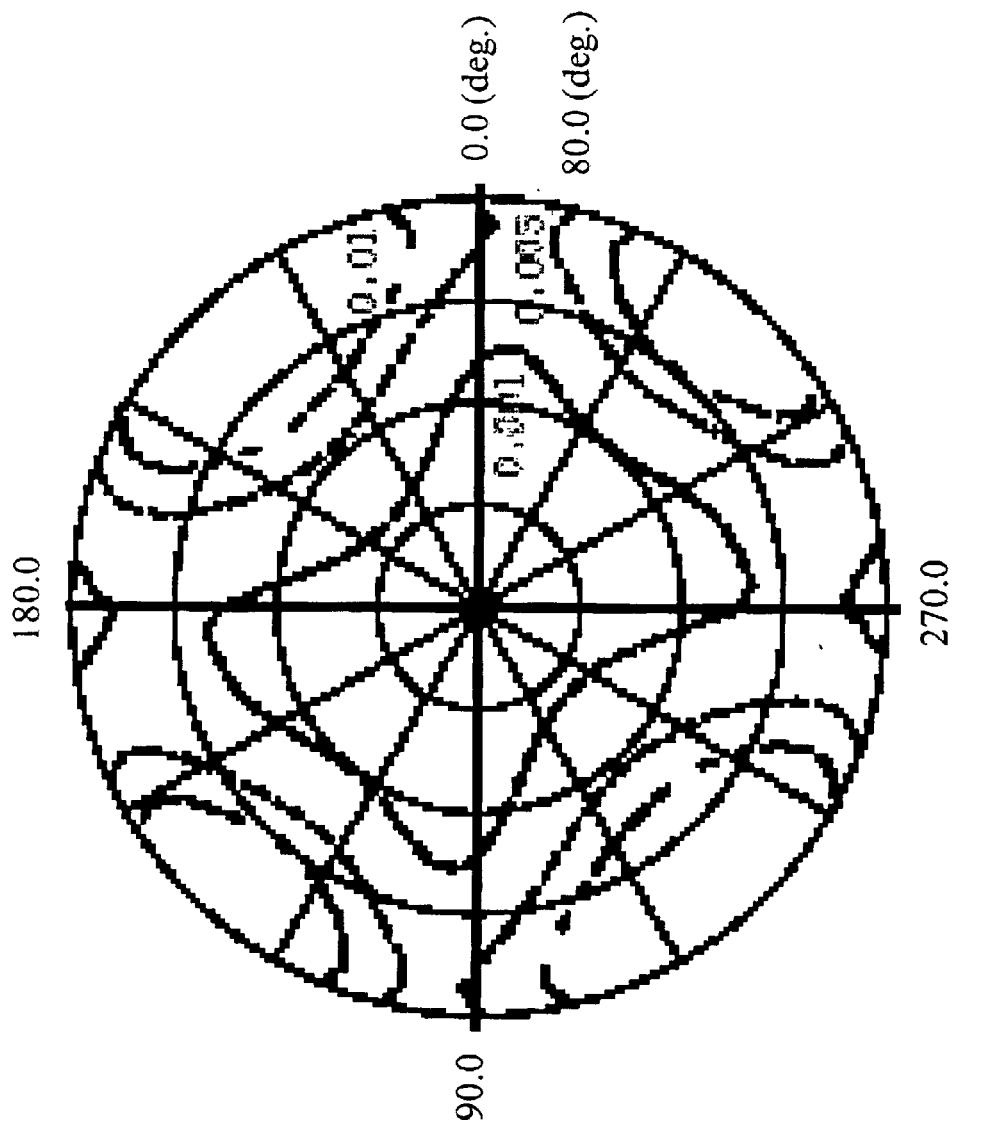
Figure 9C:
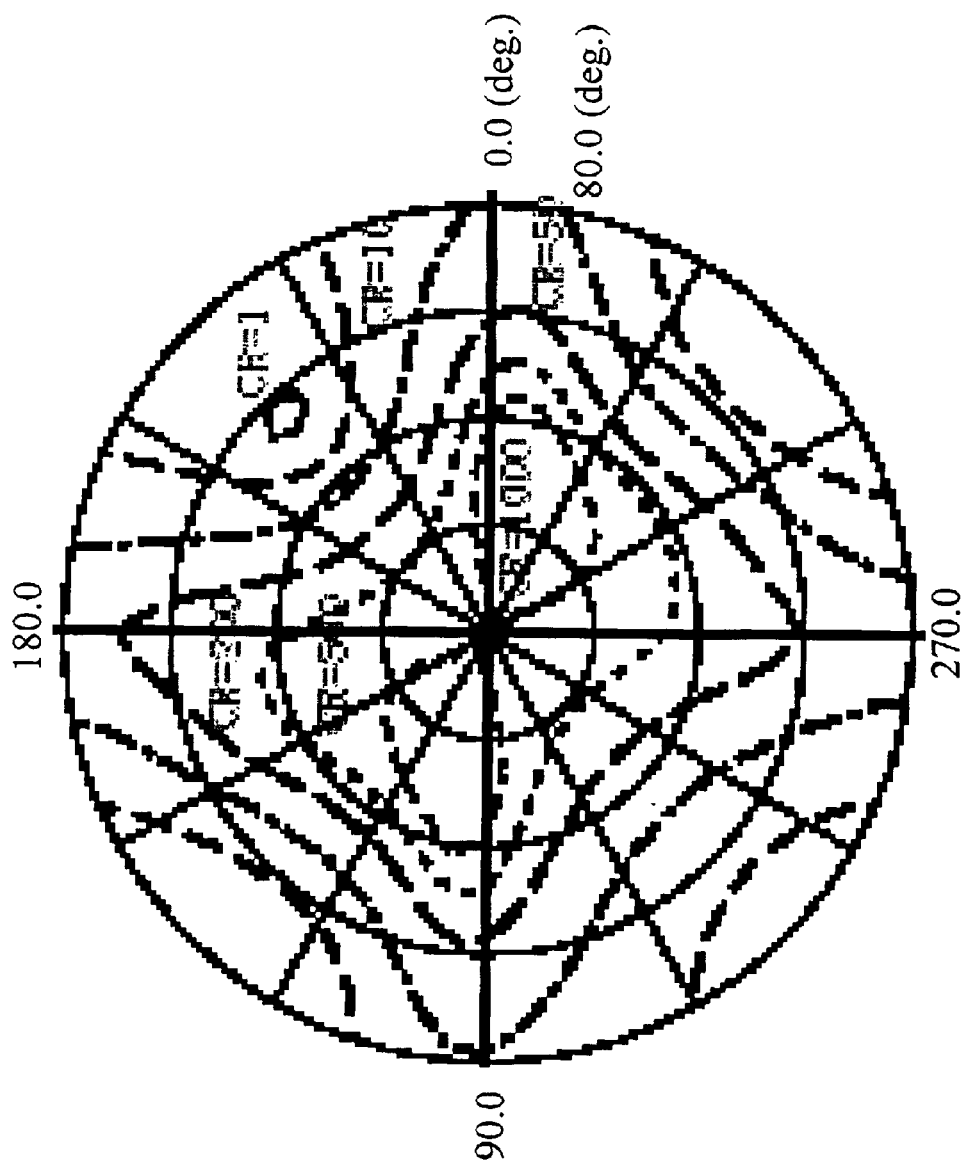

FIGS. 8a–8c show respectively the angle views in a dark state, bright state, and contrast ratio of the automatically aligned liquid crystal display under a reflective mode according to the invention. FIGS. 9a–9c show respectively the angle views in a dark state, bright state, and contrast ratio of the automatically aligned liquid crystal display under a transparent mode according to the invention. As can be seen from FIGS. 8a–9c, the automatically aligned liquid crystal display of the invention can get a very wide viewing angle under both the transparent and reflective modes, as the optical performance shown in FIG. 7.

When an electric field is applied, the transparency and the reflectivity of the automatically aligned liquid crystal display of the invention are modulated from a dark state to a bright state. The dynamic phase compensation range for the liquid crystal layer is also modulated. Therefore, the ideal polarization light intensity of the liquid crystal display under the reflective twisted nematic mode or the mixed twisted nematic mode can be achieved.

The structures of the automatically aligned liquid crystal display of the invention can be applied to a reflective wide viewing angle normal black mode TFT-LCD, a partially reflective TFT-LCD, a reflective or partially reflective normal black mode LCD, or a partially reflective LCD.

In summary, the automatically aligned liquid crystal display of the invention may comprise different structures of bumps, such as (1) convex or concave bumps are formed in the pixel region, (2) convex bumps are formed around the boundary of the pixel region, (3) convex bumps are formed around the boundary of the pixel region, and a concave bump is formed at a contact hole near the pixel center, and (4) convex bumps are formed around the boundary of the pixel region, a concave bump is formed at a contact hole near the pixel center, and surround wall bumps are formed around the boundary of the transparent area. This invention can control the pre-tilted directions of liquid crystal directors by the bump structure. Therefore, the reflective or partially reflective liquid crystal display of the invention forms multiple domains with good properties of a very high contrast ratio and a wider viewing angle.

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. A structure of an automatically aligned liquid crystal display comprising:

an upper and a lower substrates having respectively a common electrode layer and a pixel electrode layer thereon, one of said electrode layers being transparent and the other being a layer of automatically aligned diffusing reflective device, said automatically aligned diffusing reflective device having at least one convex or concave bump in each pixel region;

at least one serial retardation films formed on said upper substrate;

a polarizer formed on said serial retardation film; and a uniformly distributed liquid crystal layer formed between said two substrates;

wherein said automatically aligned diffusing reflective device further comprises a reflective metal layer and an inner diffusion layer, the average height H of said bump structure is greater than the average height h of said diffusion layer of said reflective device, but less than the liquid crystal cell gap d, liquid crystal molecules in said liquid crystal layer being vertical or near-vertical aligned before applying a driving voltage, and said liquid crystal molecules changing their direction from vertical or near-vertical alignment to slanted or near-horizontal alignment after applying a driving voltage, and the liquid crystal directors near said bumps having pre-tilted angles.

2. The structure of an automatically aligned liquid crystal display as claimed in claim 1, wherein said automatically aligned reflective device has at least one convex bump around the boundary of the pixel region.

3. The structure of an automatically aligned liquid crystal display as claimed in claim 1, wherein the ratio H/d is between 0.05 and 1.

4. The structure of an automatically aligned liquid crystal display as claimed in claim 1, wherein said structure of a liquid crystal display is applied to a partially reflective liquid crystal display and further comprises a polarizer, at least one achromatic wide-band quarter-wavelength plate, and at least one serial retardation film under said lower substrate.

5. The structure of an automatically aligned liquid crystal display as claimed in claim 2, wherein a contact hole is formed near the pixel center, and said automatically aligned diffusing reflective device has a concave bump at said contact hole and the liquid crystal directors near said concave bump have pre-tilted angles.

6. The structure of an automatically aligned liquid crystal display as claimed in claim 3, wherein a contact hole is formed near the pixel center, and said automatically aligned diffusing reflective device has a concave bump at said contact hole and the liquid crystal directors near said concave bump have pre-tilted angles.

7. The structure of an automatically aligned liquid crystal display as claimed in claim 6, wherein said automatically aligned diffusing reflective device has at least one concave bump around the boundary of transparent area.

8. The structure of an automatically aligned liquid crystal display as claimed in claim 7, wherein the cell gap $d_T$ of liquid crystals at the transparent area is greater than or equal to the cell gap $d_R$ of liquid crystals at the reflective area and $d_R \leq d_T \leq 2\, d_R$.

9. The structure of an automatically aligned liquid crystal display as claimed in claim 8, wherein 100 nm$\leq \Delta n \cdot d_R \leq$220 nm, 180 nm$\leq \Delta n \cdot d_T \leq$450 nm, and $\Delta n$ is the birefringence of liquid crystals.

10. The structure of an automatically aligned liquid crystal display as claimed in claim 1, wherein said pixel electrode layer is an electrode layer of an active matrix device.

11. The structure of an automatically aligned liquid crystal display as claimed in claim 1, wherein said pixel electrode layer is an electrode layer of a passive matrix device.

12. The structure of an automatically aligned liquid crystal display as claimed in claim 10, wherein said active matrix device is a thin film transistor or a thin film diode.

13. The structure of an automatically aligned liquid crystal display as claimed in claim 1, wherein said transparent electrode layer is an electrode layer with indium tin oxide or indium zinc oxide.

14. The structure of an automatically aligned liquid crystal display as claimed in claim 1, wherein said serial retardation film is chosen from the group of an A-plate, a C-plate, bi-axial films, and the combination of said A-plate and C-plate.

15. The structure of an automatically aligned liquid crystal display as claimed in claim 1, wherein the material for said serial retardation film includes a polymer film.

16. The structure of an automatically aligned liquid crystal display as claimed in claim 1, where said upper substrate further comprises a color filter.

17. The structure of an automatically aligned liquid crystal display as claimed in claim 1, wherein said structure of a liquid crystal display is applied to a reflective liquid crystal display and said automatically aligned diffusing reflective device has a reflective structure.

18. The structure of an automatically aligned liquid crystal display as claimed in claim 17, wherein said serial retardation film is chosen from the group of an A-plate, a C-plate, bi-axial films, and the combination of said A-plate and C-plate.

19. The structure of an automatically aligned liquid crystal display as claimed in claim 18, wherein the retardation $a_f$ of A-plate, the retardation $c_f$ of C-plate, the birefringence $\Delta n$ of liquid crystals and the cell gap $d_R$ of liquid crystal layer satisfy equations $0.8 \times \Delta n \times d_R \leq c_f + 125$ nm $\leq 1.3 \times \Delta n \times d_R$ and $0 \leq a_f \leq 50$ nm, and the unit of retardation is nm.

20. The structure of an automatically aligned liquid crystal display as claimed in claim 4, wherein said serial retardation film is chosen from the group of an A-plate, a C-plate, bi-axial films, and the combination of said A-plate and C-plate.

21. The structure of an automatically aligned liquid crystal display as claimed in claim 20, wherein the retardation $a_f$ of A-plate, the retardation $c_f$ of C-plate, the retardation $a_b$ or $c_b$ of bi-axial films, the birefringence $\Delta n$ of liquid crystals and the cell gap $d_R$ in the transparent area satisfy equations $0 \leq a_b \leq 100$ nm and $0.4 \times \Delta n \times dr \leq c_b + 65$ nm $\leq 0.75 \times \Delta n \times d_R$, and the unit of retardation is nm.

22. The structure of an automatically aligned liquid crystal display as claimed in claim 20, wherein the retardation $a_f$ of A-plate, the retardation $c_f$ of C-plate, the retardation $a_b$ or $c_b$ of bi-axial films, the birefringence $\Delta n$ of liquid crystals and the cell gap $d_R$ in the transparent area satisfy equations $0.8 \times \Delta n \times d_R \leq c_f + c_b + 185$ nm $\leq 1.3 \times \Delta n \times dr$ and 30 nm $\leq a_b + a_f \leq 120$ nm, and the unit of retardation is nm.

23. The structure of an automatically aligned liquid crystal display as claimed in claim 22, wherein the chiral dopant is added to the liquid crystal molecules so that the pitch of the liquid crystal molecules is greater than 20 μm.

24. The structure of an automatically aligned liquid crystal display as claimed in claim 22, wherein the chiral dopant is not added to the liquid crystal molecules.

25. The structure of an automatically aligned liquid crystal display as claimed in claim 1, wherein said automatically aligned diffusing reflective device has at least one opening in the transparent area.

* * * * *